No. 654,099. Patented July 17, 1900.
P. S. BATES.
SOUND REPRODUCING INSTRUMENT.
(Application filed Oct. 10, 1899.)
(No Model.) 3 Sheets—Sheet 1.
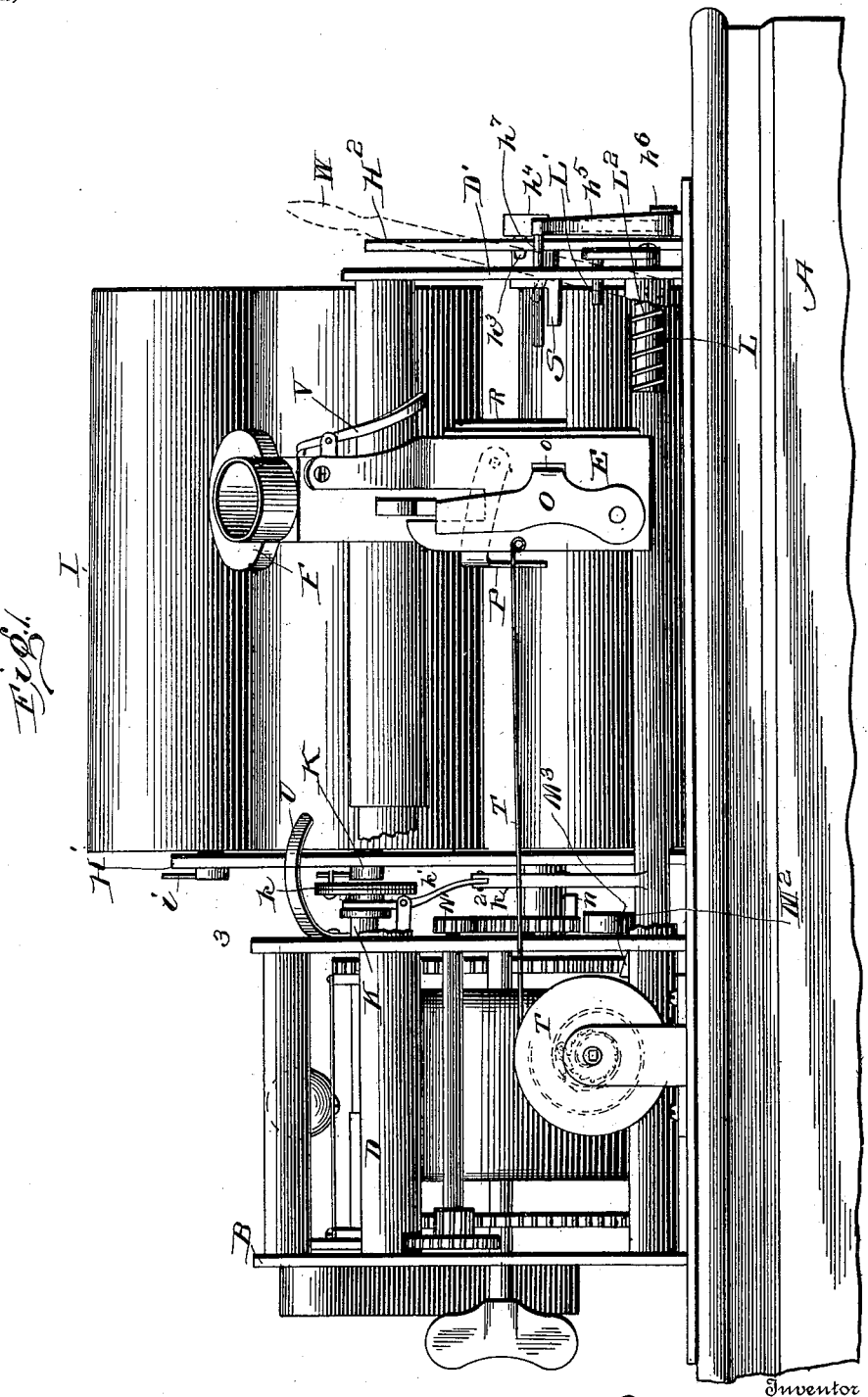
Witnesses
J. M. Fowler Jr.
J. P. Peyton, Jr.
Inventor
Peter S. Bates,
by Church & Church
his Attorneys.

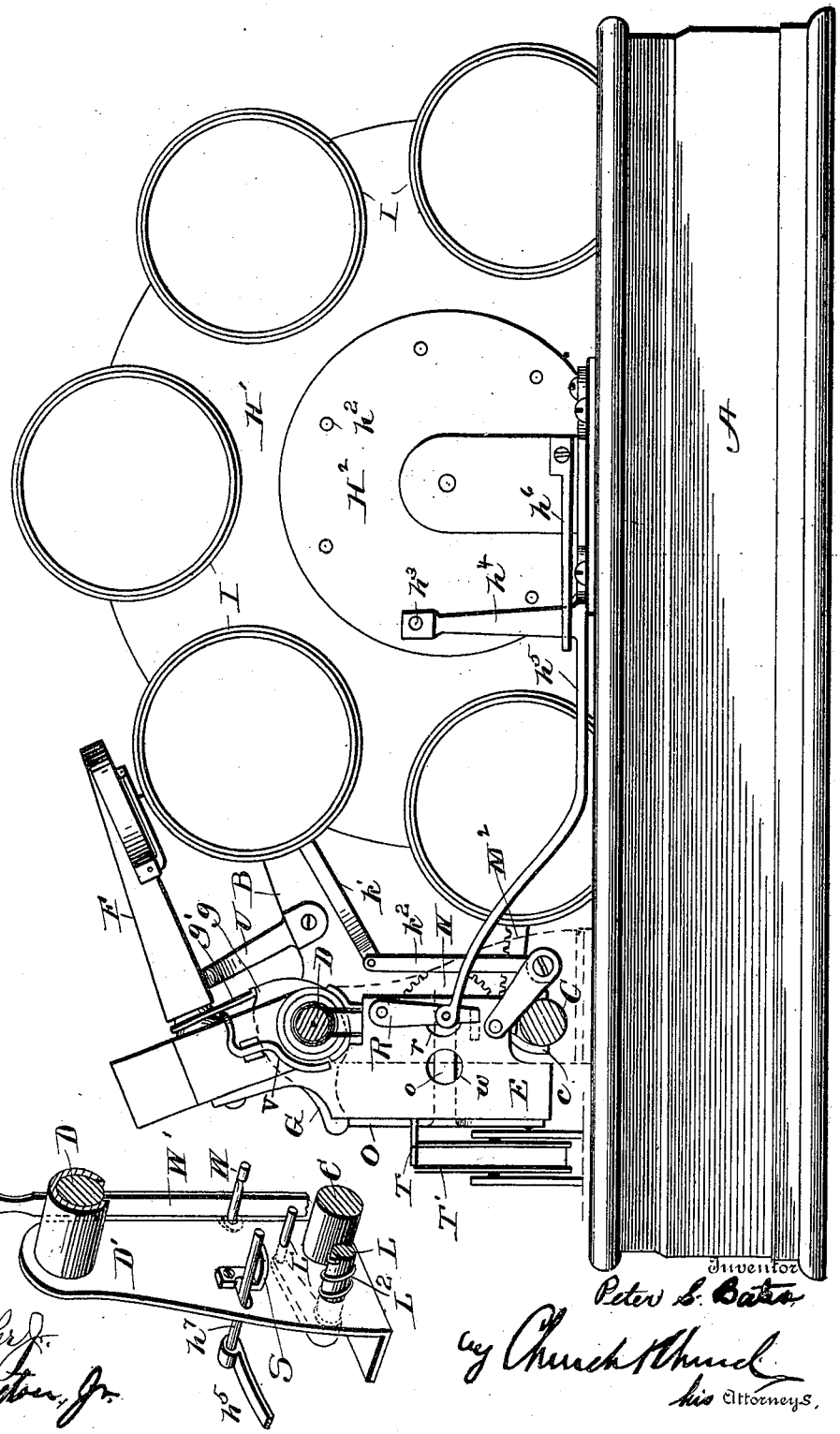

No. 654,099. Patented July 17, 1900.
P. S. BATES.
SOUND REPRODUCING INSTRUMENT.
(Application filed Oct. 10, 1899.)
(No Model.) 3 Sheets—Sheet 3.
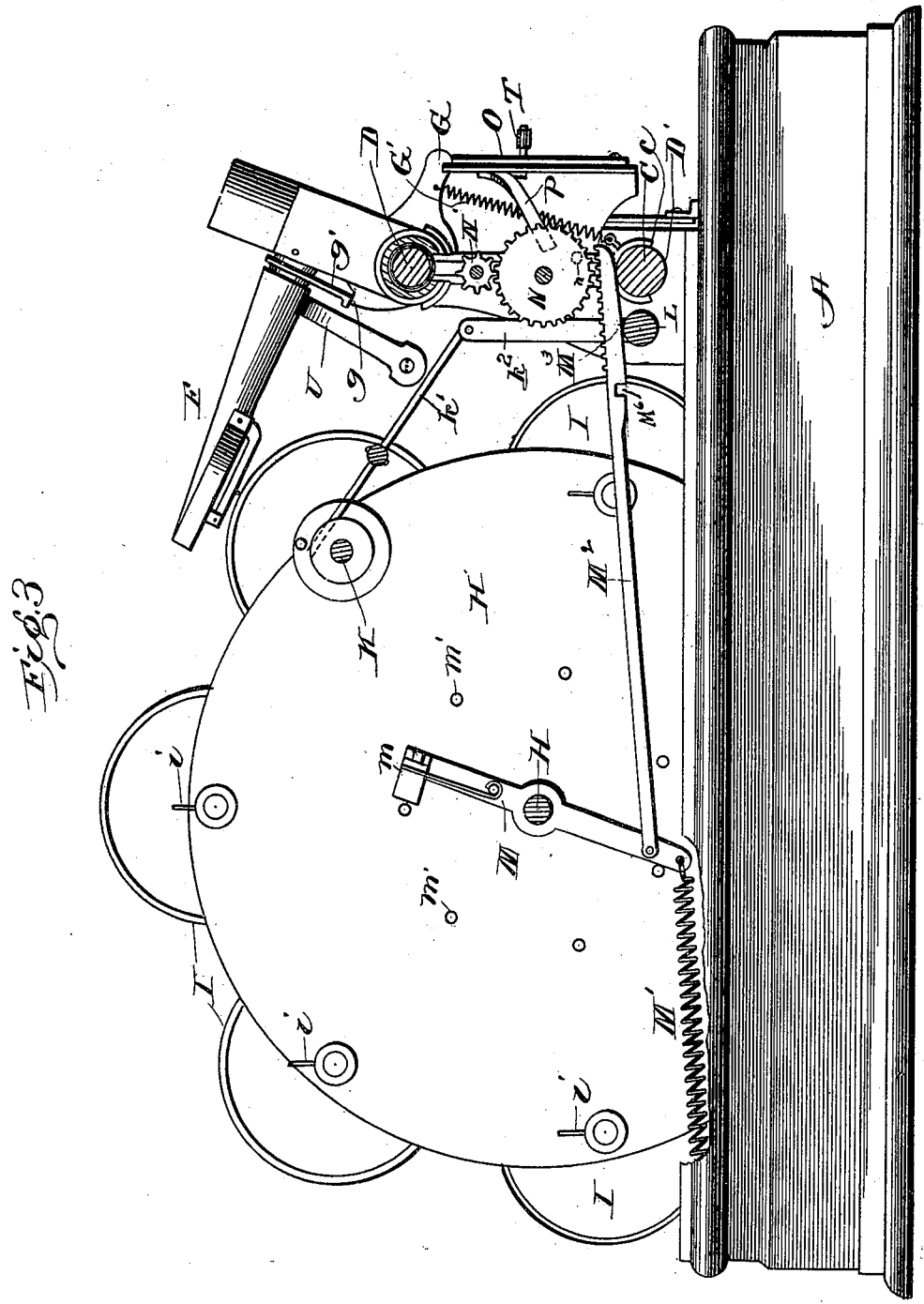
Witnesses
J. M. Fowler Jr.
J. B. Peyton, Jr.
Inventor
Peter S. Bates,
by Church & Church
his Attorneys.
THE NORRIS PETERS CO., PHOTO-LITHO., WASHINGTON, D. C.

UNITED STATES PATENT OFFICE.

PETER SYLVANUS BATES, OF YORK, PENNSYLVANIA, ASSIGNOR OF ONE-HALF TO EDWIN W. LOUCKS, OF SAME PLACE.

SOUND-REPRODUCING INSTRUMENT.

SPECIFICATION forming part of Letters Patent No. 654,099, dated July 17, 1900.

Application filed October 10, 1899. Serial No. 733,159. (No model.)

*To all whom it may concern:*

Be it known that I, PETER SYLVANUS BATES, a citizen of the United States, residing at York, in the county of York and State of Pennsylvania, have invented certain new and useful Improvements in Sound-Reproducing Instruments; and I do hereby declare the following to be a full, clear, and exact description of the same, reference being had to the accompanying drawings, forming a part of this specification, and to the letters of reference marked thereon.

This invention relates to improvements in sound-reproducing instruments, such as are commonly known as "phonographs" or "graphophones" and in which the record is formed on the surface of cylinders of composition or material capable of receiving indentations corresponding to the sound to be produced.

It has for its object to provide a mechanism whereby with one reproducer and motor mechanism the records on a number of different cylinders may be successively subjected to the action of the reproducer automatically or a single record may be subjected to such action a number of times, in accordance with the wishes of the operator.

The invention consists in an instrument having a motor mechanism with a reproducer adapted to be automatically reciprocated thereby and a cylinder-carrier for a series of cylinders adapted to be intermittently moved so as to bring each of such cylinders successively within the field of action of the reproducer, such instrument embodying certain novel details of construction and combinations and arrangements of parts, whereby the movements are rendered more certain, the work imposed upon the motor reduced to a minimum, the records preserved against mutilation in the automatic shifting of the device, and the operator entirely relieved from responsibility or care respecting the running of the apparatus other than to see that sufficient power is given the motor should the same weaken or become run down in the operation of the machine.

Referring to the accompanying drawings, Figure 1 is a front elevation of a phonograph or sound-reproducing instrument embodying my present improvements, the horn being omitted and overlying shafts broken away to disclose underlying parts. Fig. 2 is an elevation looking at the right-hand end of the machine shown in Fig. 1 with the end frame which supports the reproducer removed and the reproducer-shafts in section. Fig. 3 is a section on the line 3 3, Fig. 1, with the base in elevation. Fig. 4 is a perspective view showing the right-hand end of the reproducer-frame, which is omitted in Fig. 2.

Like letters of reference in the several figures indicate the same parts.

The letter A indicates a base or support of any suitable character, preferably, however, made ornamental, as shown, and upon which is mounted a frame B, which at the left-hand end carries a motor, and governing mechanism for regulating the speed of the motor, preferably, such as is in common use at the present day on phonographs, and therefore need not be further described.

Extending across the front of the frame B are the usual shafts C and D for the reproducer-carriage E, the upper one, D, of said shafts containing the usual screw for advancing the carriage, and the lower shaft C being embraced by a fork *c* at the bottom of the carriage for maintaining the carriage in its proper vertical position. At the right-hand end of the machine the said shafts C and D are united by an end frame D', Fig. 4.

The reproducer F is pivotally mounted on the upper portion of the carriage and is adapted to be elevated when so desired by a trip or cam G, pivoted in the carriage and having a nose or projection *g*, adapted to contact with a foot *g'* on the reproducer. In the present construction this trip G is held normally in position to raise the reproducer by means of a spring G', the tension of which must be overcome by appropriate mechanism, to be presently described, before the reproducer is lowered and the carriage thrown into engagement with the feed-screw, the construction of the trip G for effecting the engagement of the carriage with the screw being of the usual construction and forming no part of my present invention.

In rear of the feed-screw and reproducer-carriage there is mounted in the frame B or upon appropriate standards extending upwardly from the base A a cylinder or record-carrier consisting of a shaft H, having at one end a relatively-large disk or support H', around the periphery of which and in regular order are journaled the cylinder-cones I. The shafts which are connected with the cones I preferably extend through the disk H' and are provided with transverse projections or pins $i$, adapting them for engagement with the motor mechanism when in position for the reproducer to coöperate with the cylinder carried by the cones. The opposite ends of the cones I are unobstructed, as in the case of the ordinary graphophone, adapting the device for having the cylinders readily slipped on or off the same; but within the circle of cylinders at this end of the machine the shaft H is provided with a second disk $H^2$, Fig. 2, constituting a locking-disk and with which a locking mechanism, to be hereinafter described, is adapted to coöperate for holding the cylinders rigidly while the record on one of them is being traversed by the reproducer.

The motor embodies a cylinder-driving shaft K, and in the automatic running of the machine each cylinder is successively brought into alinement with this shaft K and coupled therewith by a clutch, after which the carriage and reproducer are advanced until the end of the record is reached, when the movement of the carriage automatically effects the raising of the reproducer, the unlocking of the cylinder-carrier, the disengagement of the clutch between the cylinder-cone and its shaft K, and the engagement of the motor with the cylinder-carrier to advance the carrier until the next cylinder is in position, and, finally, the disengagement of the carriage from the feed-screw permitting said carriage to automatically return to its starting position under the influence of a separate return-motor. To accomplish these results the shaft K is provided with a longitudinally-movable clutch $k$, controlled by the shifting-lever $k'$, and the latter is in turn connected with an arm $k^2$ on a longitudinally-movable shaft L, which latter extends from the motor end of the machine to and through the frame D' and carries a pin or inwardly-extending projection L', Fig. 1, with which the carriage is adapted to contact for moving the shaft longitudinally against the tension of a spring $L^2$, surrounding the same. The disk $H^2$, before referred to as constituting part of a lock for holding the cylinder-carrier, is preferably provided with a series of apertures $h^2$, with which a conical pin $h^3$ on the upper end of an arm $h^4$ of a lock-frame $h^5$ is adapted to coöperate. The lock-frame $h^5$ is pivoted to the base at the rear end and advanced by a spring $h^6$, while at its forward end it is provided with a relatively-long pin or projection $h^7$, extending inwardly through the frame D' and in position to contact with the reproducer-carriage E as the latter reaches the farther limit of its movement. The carriage E first contacts with the pin $h^7$ and finally with the projection L'. Thus the cylinder-carrier is unlocked and also disengaged from the cylinder-motor shaft by the forward travel of the carriage, and in order to effect the feed or advance of the cylinder-carrier an oscillatory drive-pawl M is provided, preferably mounted on the shaft H in proximity to the disk H'. One end of said drive-pawl is provided with a spring-pressed nose $m$, adapted to coöperate with one of a series of pins or teeth $m'$ on the disk H' and corresponding in number to the number of cylinder-cones carried thereby. A spring M' is provided for moving the pawl M in one direction, while a rack-bar $M^2$ is provided for moving it in the opposite direction to advance the cylinder-carrier. This rack-bar $M^2$ extends forwardly, preferably above the shafts L and C, and is in position to be moved upwardly into mesh with a gear-wheel N, which is driven constantly by the motor when running through the medium of a small pinion N'. The shaft L is provided with a wedge or incline, and when said shaft L is moved longitudinally by the reproducer-carriage E in addition to unclutching the cylinder-drive shaft from the cylinder-cone the incline $M^3$ passes under and moves the rack-bar $M^2$ up into engagement with the gear-wheel N to advance the cylinder-carrier. As the rack reaches the end of its stroke a notch or recess $M^6$ comes opposite the incline and allows the rack to drop out of mesh with its gear. Then when the shaft L returns to normal position the incline moves out of the notch and the rack-bar is free to return to its normal position. A pivoted retainer O, mounted on the reproducer-carriage and having an arm $o$, Fig. 2, extending back through said carriage, is provided for holding the trip G in position to permit the reproducer to engage with the record on the cylinder, such retainer being preferably moved by gravity in beneath the forward end of the trip G whenever the latter is raised, and in order to raise the trip G when the carriage is at the left-hand end or starting-point the gear-wheel N is provided with a pin or projection $n$, adapted to pass under and raise an elevator-arm P, pivoted on the reproducer-carriage and working up under the forward end of the trip G, as will be readily understood from an inspection of Figs. 1 and 3, such elevator-arm, however, normally being in its lowermost position and inoperative save when the carriage is at the starting-point, when it is brought within range of the projection $n$.

In order now that the carriage may be automatically disengaged from the feed-screw and the reproducer held elevated during the return movement and that such disengagement and return movement shall take place after the cylinder-carrier has advanced, the said carriage is provided on its left-hand side with a pendulous guard R, adapted normally to hang vertically over an aperture $r$ in the side wall of the carriage and to coöperate with the pin $a^7$ of the locking mechanism to release the latter. The engagement of the pin $h^7$ with the guard R takes place before the carriage has reached the extreme end of its travel, and as the carriage continues its movement the said guard strikes and is deflected rearwardly by an incline S on the end frame D', (see Fig. 4,) thereby riding out of engagement with the pin $h^7$, and the latter, under the influence of its spring $h^6$, passing inwardly through the aperture $r$, coöperates with the arm $o$ on the retainer O, releasing the latter from its engagement with the trip G, which thereupon drops and disengages the carriage from the feed-screw, the tapered pin simultaneously entering one of the apertures in the disk $H^2$. The carriage being disengaged is at once returned to the starting-point through the medium of a flexible connection T, extending from the carriage to and around a return-motor drum T', located on the base at the left-hand end of the instrument. When so returned, the elevator-arm is brought within range of the projection $n$ and the trip G raised, so as to allow the reproducer to engage the cylinder to throw the carriage into engagement with the feed-screw; but in order to prevent the reproducer from dropping suddenly upon the cylinder I prefer to arrange a spring or incline U in position to receive the impact of the reproducer as it drops and to allow the same to pass down upon the cylinder gradually as the carriage begins its forward movement.

Inasmuch as with the mechanism described the reproducer is raised only as the carriage begins its return movement and as it is desirable that the cylinders shall have completed their change at this time provision is made for preliminarily raising the reproducer in order that there may be no danger of injuring the reproducer or mutilating the record as the cylinder-carrier advances. For this purpose a bent arm V is pivoted to the left-hand side of the carriage, with its forward end lying beneath the base of the reproducer, while its outer end extends down into position to contact with the inside of the frame D', so as to raise the reproducer before the lock for the cylinder-carrier is released. Thus the reproducer is entirely disengaged from the cylinder or record prior to the advance of the next record into position.

Where it is desired that the same record shall be gone over again and again, or, in other words, where it is desired that the carrier shall not advance for the presentation of another record, it is obvious that it is only necessary to provide for releasing the trip G before the carrier reaches the controlling-pins L' and $h^7$, and for this purpose I have provided a trip device consisting of a pin or projection W, carried by a pivoted handle W' and adapted when in the position shown in Fig. 4 to pass in through an aperture $w$ in the carriage-frame and contact with the arm $o$, so as to release the trip G before the carriage contacts with or advances the pins $h^7$ and L' a sufficient distance to operate the cylinder-carrier. When it is desired that the records shall be advanced successively, the handle W' may be moved back out of the way or to the position indicated in dotted lines in Fig. 1.

Having thus fully described my invention, what I claim as new, and desire to secure by Letters Patent of the United States, is—

1. In a sound-reproducing instrument, the combination with a record-cylinder support, a motor for driving said support, a reproducer-carriage driven by the motor, a reproducer pivotally mounted on the reproducer-carriage, and means for automatically returning said carriage to its initial position when disengaged from the motor, of a trip mechanism carried by the carriage and independent of the motor controlling the engagement of the carriage and motor and for elevating the reproducer, a throw-out mechanism with which the trip is brought into engagement by the movement of the carriage for rendering said trip operative to release the carriage and raise the reproducer when the carriage reaches the extreme of its movement and a motor-controlled elevator for moving said trip in the opposite direction as the carriage reaches its initial or starting position; substantially as described.

2. In a sound-reproducing instrument, the combination with a record-cylinder carrier, a reciprocating reproducer-carriage, motor mechanism for moving said carriage in opposite directions and a reversing mechanism for reversing the movement of the carriage at opposite extremes of its travel, of an elevating mechanism for the reproducer operative upon the return movement of the carriage and a fixed incline for receiving and supporting the reproducer when released from said elevating mechanism and off of which the reproducer rides as it advances from its starting position; substantially as described.

3. In a sound-reproducing instrument, the combination with a record-cylinder support, a reciprocatory reproducer-carriage, a motor for driving said record-cylinder support and carriage, means for disengaging the carriage from said motor during the return movement of the carriage, and a reproducer pivotally mounted on the carriage, and automatically elevated by the disengagement of the carriage, and motor, of a fixed incline or support upon which said reproducer rests when at the starting-point whereby upon the reëngagement of the motor-carriage the reproducer will be allowed to ride down off of the said incline or support and gradually engage or contact with the record-cylinder; substantially as described.

4. In a sound-reproducing instrument, the combination with a record-cylinder-support carrier, having a multiplicity of supports therein, a reciprocatory reproducer-carriage, motor mechanism for rotating said supports, for moving the carrier intermittingly and reciprocating the carriage, of a reproducer pivotally mounted on the carriage, mechanism controlled by the carriage for coupling the motor and carrier, whereby the carrier is advanced as the carriage reaches the extreme of its movement, the elevator for lifting the reproducer and means for operating said elevator before the carriage reaches the extreme of its movement, whereby the said reproducer is held out of contact with the record-cylinder during the shifting of the carrier; substantially as described.

5. In a sound-reproducing instrument, the combination with a record-cylinder-support carrier, having a multiplicity of supports thereon, each independently rotatable, a reproducer-carriage and a motor mechanism for advancing the carrier, rotating the cylinder-supports in succession as they are advanced into position and reciprocating the carriage with reversing mechanism controlled by the carriage for reversing its direction of movement as it nears each extreme of its travel, of a reproducer pivotally mounted on the carriage, an elevator coöperating with the reproducer as the carriage reaches the extreme of its movement and means for holding said reproducer elevated during the return movement of the carriage; substantially as described.

6. In a sound-reproducing instrument, the combination with a motor and a reproducer-carriage, driven thereby, of a record-cylinder-support carrier, a series of record-cylinder supports journaled therein and adapted to be brought successively into alinement with a motor drive-shaft and a clutch controlled by the carriage for connecting said motor drive-shaft and the cylinder-support in alinement therewith; substantially as described.

7. In a sound-reproducing instrument, the combination with a record-cylinder-carrier support, a series of cylinder-carriers journaled thereon, and having projecting shafts, a lock for holding said carrier in position, and a motor mechanism having a motor drive-shaft for rotating each of said cylinder-carriers in succession and connections between said motor-carrier for moving the latter intermittently, of a reproducer-carriage driven by the motor mechanism, a clutch interposed between the motor drive-shaft and cylinder-carrier in alinement therewith, a controlling mechanism for said clutch operated by the reproducer-carriage, a controlling mechanism for the carrier and a controlling mechanism for the lock for said carrier, both operated by said carriage; substantially as described.

8. In a sound-reproducing instrument, the combination with a record-cylinder-support carrier journaled on a central shaft and having a series of peripheral cylinder-carriers journaled therein with their shafts projecting at one end, a motor having a motor drive-shaft with which said supports are adapted to be brought into alinement, a clutch carried by said motor drive-shaft and adapted to engage the cylinder-shafts, and a reciprocatory reproducer-carriage driven by said motor, of a train of gearing interposed between the motor and cylinder-support carrier, with means controlled by the reproducer-carriage, for throwing the said train of gearing into or out of action for advancing the carrier or permitting the same to remain stationary, and connections between said clutch and said gear-train-controlling mechanism, whereby said clutch is moved into operative position or out of operative position in unison therewith; substantially as described.

9. In a sound-reproducing instrument, the combination with a motor, a reciprocatory reproducer-carriage driven thereby and a rotary record-cylinder-support carrier, carriers journaled thereon and means for coupling any one of said supports with the motor for rotating the supports, of a drive-pawl for rotating the carrier, a rack-bar connected with said pawl, a gearing driven by the motor and with which said rack-bar is adapted to engage and a shaft controlled by the carriage for moving said rack-bar into mesh with the gear; substantially as described.

10. In a sound-reproducing instrument, the combination with a motor, a reciprocatory reproducer-carriage, driven thereby and a record-cylinder-support carrier having a series of independent record-cylinder supports journaled therein and adapted to be rotated by the motor, of a carrier drive-pawl, a rack-bar connected therewith, a gear-wheel driven by the motor, a longitudinally-movable shaft having a projection extending into the path of the carriage, and an incline on said shaft for moving the rack-bar into mesh with its drive-gear; substantially as described.

11. In a sound-reproducing instrument, the combination with a motor, a reciprocatory reproducer-carriage driven thereby, a record-cylinder-support carrier having a series of independent cylinder-supports journaled therein and a clutch for coupling any one of said supports with the motor, of a carrier drive-pawl, a rack-bar connected therewith, a gear-wheel driven by the motor for moving said rack-bar, a longitudinally-movable shaft having a projection extending into the path of the carrier for moving the shaft longitudinally, an incline on said shaft for moving the rack-bar into mesh with its drive-gear and connections between said shaft and clutch whereby when the shaft is moved longitudinally by the carriage, the connection between the motor and cylinder-support will be broken and the connection between the carrier and motor will be established for bringing a new cylinder into position; substantially as described.

12. In a sound-reproducing instrument, the combination with a record-cylinder support, a motor for rotating said support, and a reciprocatory carriage adapted to be driven by the motor in one direction, with a return-motor for said carriage, of a reproducer pivotally mounted on the carriage, a trip for raising and lowering said reproducer and engaging the carriage and motor, a spring for holding said trip normally in position to elevate the reproducer and disconnect the motor and carriage, a pivoted retainer for holding the trip in its opposite position of adjustment and a projection lying in the path of said retainer and coöperating therewith to release the trip therefrom as the carriage reaches the extreme of its movement; substantially as described.

13. In a sound-reproducing instrument, the combination of the following instrumentalities, to wit, a reproducing mechanism, a series of record-cylinder supports, a rotary carrier on which said supports are mounted, a motor mechanism, connections between said motor mechanism and carrier and between the motor and one of said cylinders both controlled by the reproducing mechanism, and a lock for said carrier released by the reproducing mechanism in advance of the disengagement of the motor and record-cylinder support and in advance of the engagement of the motor and carrier; substantially as described.

14. In a sound-reproducing instrument, the combination of the following instrumentalities, to wit, a series of record-cylinder supports, a rotary carrier, in which said supports are journaled, a motor mechanism for advancing the carrier intermittingly and for rotating the supports in succession, a reproducer-carriage and reproducer driven by the motor, a return-motor mechanism for said carriage, carrier-controlling mechanism interposed in the path of the carriage near the outer extreme of its movement and tripping mechanism for breaking the connection between the carriage and advancing motor subsequent to the operation of the carrier-operating devices, whereby in the forward movement of the reproducer-carriage, the record-support carrier will be first advanced and the reproducer-carriage subsequently returned to normal position; substantially as described.

15. In a sound-reproducing instrument, the combination with a motor and a record-cylinder carrier, having a series of cylinders thereon and adapted to be intermittingly rotated to present the cylinders successively, of a reproducer-carriage and reproducer, mechanism controlling the connections between the motor and carrier for moving the latter, said mechanism having projections extending into the path of and adapted to be operated by the carriage, and a trip for releasing the carriage from the motor to permit of its return to initial position, of a throw-out device for releasing said trip before the carriage reaches the projections on the carrier-controlling mechanism, whereby when desired the same record may be reproduced over and over; substantially as described.

16. In a sound-reproducing instrument, the combination of the following instrumentalities, to wit, a rotary carrier, a series of record-cylinder supports journaled thereon, a motor mechanism, a reciprocatory carriage, a lock for holding the carrier having a projection extending into the path of the carriage, a trip for disconnecting the carriage and motor adapted to be operated by said projection, and a movable member interposed between said projection and trip-releasing devices and an incline for moving said movable member whereby the lock will be first released by the engagement of said projection with said movable member and when said member is displaced by the incline said projection will coöperate with the trip mechanism to release the carriage from the motor and permit it to return to initial position; substantially as described.

PETER SYLVANUS BATES.

Witnesses:
D. M. EVERHART,
J. J. BODDERS.